Sept. 21, 1954  H. N. WEBSTER  2,689,752
PIPE COUPLING
Filed Jan. 12, 1951
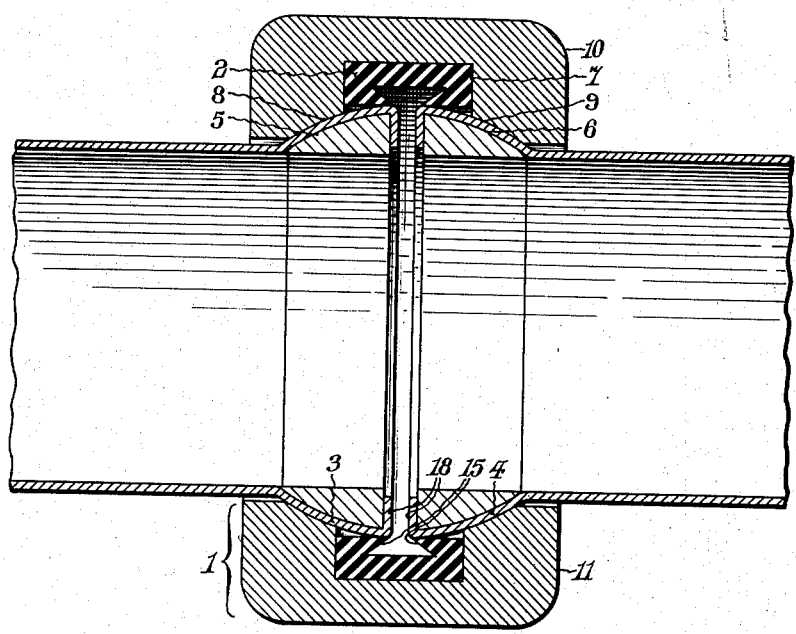
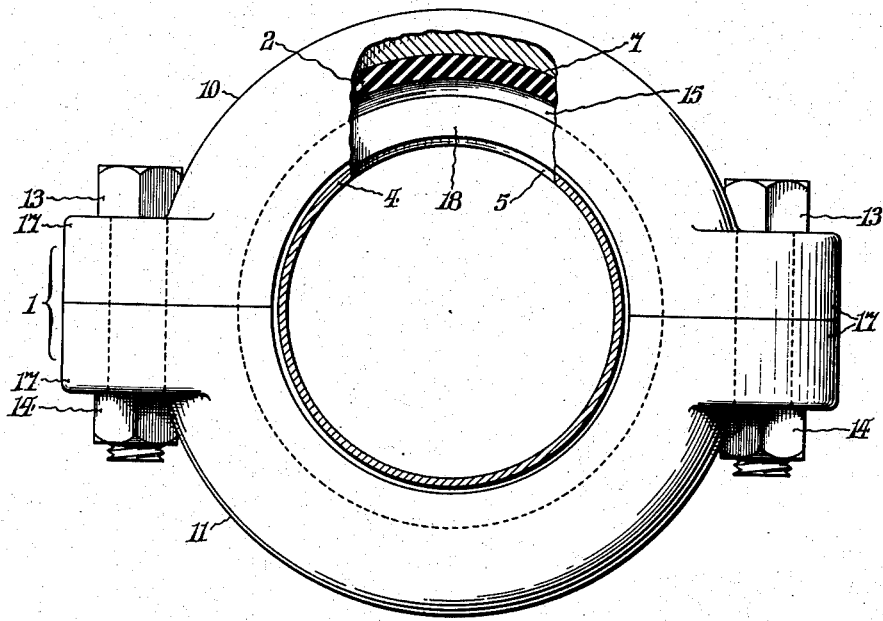
INVENTOR:
Henry N. Webster,
BY Paul & Paul
ATTORNEYS.

Patented Sept. 21, 1954

2,689,752

UNITED STATES PATENT OFFICE 2,689,752

PIPE COUPLING

Henry N. Webster, Sebring, Fla., assignor to Webster Corporation, Sebring, Fla., a corporation of Florida Application January 12, 1951, Serial No. 205,815

2 Claims. (Cl. 285—94)

This invention relates generally to pipe couplings and more particularly to pipe couplings for thin walled tubing.

The use of thin walled tubing for high pressure conditions within the tubing has been limited in the past because of the failure of available couplings and not because of the strength of the tubing itself. In other words, thin walled tubing can withstand much higher pressures than the couplings available hitherto. Therefore one of the principal objects of the present invention is to provide a coupling for thin walled tubing that will withstand pressure conditions comparable to the tubing itself.

In general terms, the pipe coupling described and claimed herein comprises a body, a gasket positioned in said body, two pipe ends expanded within said body and in contact with said gasket and rounded retainer rings positioned within said pipe ends in cooperative relation with said body and gasket.

In addition to effective operation under high pressure conditions, other advantages of this invention will become apparent from the detailed description of a preferred form thereof, as illustrated in the accompanying drawings.

Fig. 1, of these drawings, shows a longitudinal section of the invention; and

Fig. 2 shows an end view thereof, partially in section.

In describing the invention as illustrated in the drawings, a specific terminology will be resorted to for the sake of clarity. However, it is to be understood that there is no intention of being limited to the specific terms so selected but on the contrary each specific term is intended to include all technical equivalents which operate in a similar manner to accomplish a similar purpose.

For the purpose of description, the invention may be analyzed into a body 1, a resilient gasket 2 positioned therein, oppositely disposed pipe-ends 3 and 4, and retaining and reinforcing rings 5 and 6 positioned within the pipe ends 3 and 4, respectively.

The body 1 may be formed as a split collar of any conventional metal or composition having suitable strength characteristics and comprises two identical semi-circular body components 10 and 11 which are firmly held in assembly by the bolts 13 and associated clamp nuts 14, the bolts 13 extending through holes formed in lugs 17. A centrally positioned internal circumferential channel 7 is formed within the body 1 to receive the circular gasket 2. Two identical concave spherical surfaces, 8 and 9, are also formed on the interior of the body 1, one on each side of the channel or groove 7. The curvature of these surfaces 8 and 9 is complementary to the curvature of the outer surfaces of the retaining rings 5 and 6. The gasket 2 may be formed from any suitable resilient material within the experience of the art and has two identical peripheral lips 15 formed on the opposite sides thereof. These lips 15 extend inwardly of the gasket and are spaced therefrom to permit relative movement therewith under pressure from the expanded tube ends 3 and 4. The internal cavity formed within the gasket 2 by the lips 15 communicates with the interior of the two joined tubes through the substantial registry of the opening between the lips 15 and the opening or space between the expanded tube ends 3 and 4. In this way, the fluid pressure within the tubes is transmitted to the cavity in the gasket 2 and forces the lips 15 into pressure contact with the expanded tube ends 3 and 4 to prevent leakage.

The retaining rings 5 and 6 are identical and have outer surfaces which are spherically curved complementarily to the concave surfaces 8 and 9 in the interior of the body or collar 1. These rings 5 and 6 are positioned within the expanded tube ends 3 and 4 which are conformed to the curvature thereof. Circumferential lips 18 are formed on the ends of the tubes to function as retaining shoulders in holding the rings 5 and 6 in place.

The assembly of the invention will be obvious from the above detailed description. The retaining rings 5 and 6 are positioned within the expanded tube ends in advance of the assembly of the joint, the lips 18 being formed by bending inwardly the terminal edges of the tube ends. In assembling the joint, the tube ends 3 and 4 are aligned in spaced relation within the gasket 2. The body elements 10 and 11 are then positioned over the gasket 2 and associated tube ends 3 and 4 with the gasket 2 seated in the channel 7, and the spherically curved tube ends 3 and 4 in contact with the complementary concavely curved surfaces 8 and 9 within the body 1. The bolts 13 and associated nuts 14 are then introduced into the assembly and tightened up, thus completing the joint. It is to be particularly noted that the several spherical surfaces above referred to are all concentric and have their common center of curvature at the center of the coupling.

The joint may be subjected to pressure which will burst the tubing without developing leaks or failure at the joint. Further, the joint is adjustable, within limits, to misalignment of tube ends without weakening the integrity of the joint. The joint is simple in construction and assembly and may be manufactured economically. It will be obvious to those skilled in the art that variations and changes may be made in the above described preferred form of the invention without departing from the substance of the invention as hereinafter claimed.

Having thus described my invention, I claim:

1. A pipe coupling for uniting two pipe sections whereof the confronting ends are outwardly swelled and spherically curved with the center of curvature at the center of the coupling, said coupling comprising a diametrically split clamp collar engageable over the enlarged ends of the two pipe sections and having a centrally disposed internal circumferential groove square in cross section and wider than a clearance between the pipe ends and flanked by annular conformative surfaces to bear circumferentially upon portions of the spherical surfaces of the enlargements on the pipe ends; and a resilient ring gasket snugly lodged in the groove of the collar having an annular cavity dove tail in cross sectional configuration and communicative with the aforesaid clearance, and affording lips to bear circumferentially upon the remaining portions of the spherical surfaces of the end enlargements of the two pipe sections.

2. A coupling according to claim 1, wherein the pipe sections are of relatively thin metal and expanded to form the end enlargements, and wherein said enlargements are formed about solid section reinforcing rings whereof the internal diameter corresponds to that of the pipe sections.

References Cited in the file of this patent

UNITED STATES PATENTS

| Number | Name | Date |
|---|---|---|
| 622,534 | Preschlin | Apr. 4, 1899 |
| 984,086 | Graham | Feb. 14, 1911 |
| 1,541,601 | Tribe | June 9, 1925 |
| 1,925,335 | Murphy | Sept. 5, 1933 |

FOREIGN PATENTS

| Number | Country | Date |
|---|---|---|
| 309,656 | Great Britain | Apr. 18, 1929 |
| 570,261 | Great Britain | June 28, 1945 |